United States Patent

[11] 3,523,561

[72] Inventor Roberto Galeazzi
Via Oldoini 75, La Spezia, Italy
[21] Appl. No. 674,341
[22] Filed Oct. 10, 1967
[45] Patented Aug. 11, 1970
[32] Priority Oct. 17, 1966
[33] Italy
[31] 26,732/66

[54] METHOD AND MEANS FOR COMPLETELY SUBSTITUTING GASEOUS MIXTURES IN CLOSED ROOMS
5 Claims, 1 Drawing Fig.
[52] U.S. Cl. .................................................. 141/7, 128/204, 141/66
[51] Int. Cl. .................................................. A61m 16/02, F17c 5/00
[50] Field of Search .......................................... 128/204; 141/7, 64, 65, 66

[56] References Cited
UNITED STATES PATENTS
3,020,121 2/1962 Bull .......................... 141/66XR Primary Examiner— Richard C. Pinkham
Assistant Examiner— Paul E. Shapiro
Attorney—Berman, Davidson and Berman ABSTRACT: In order to substitute an original gaseous mixture with another breathable substitution mixture in a closed chamber, provided with an inlet and an outlet, in presence of persons, in the chamber flexible impervious membranes or bags are so arranged that by introducing into the chamber the gaseous substitution mixture under pressure through said inlet, it inflates the membranes or bags within the chamber and promotes the expulsion, through said chamber outlet, of the original mixture. By putting the space which originally contained the original mixture into communication with the space containing the breathable substitution mixture, this fills up the space where the persons are present and completely substitutes the original mixture.

Patented Aug. 11, 1970  3,523,561
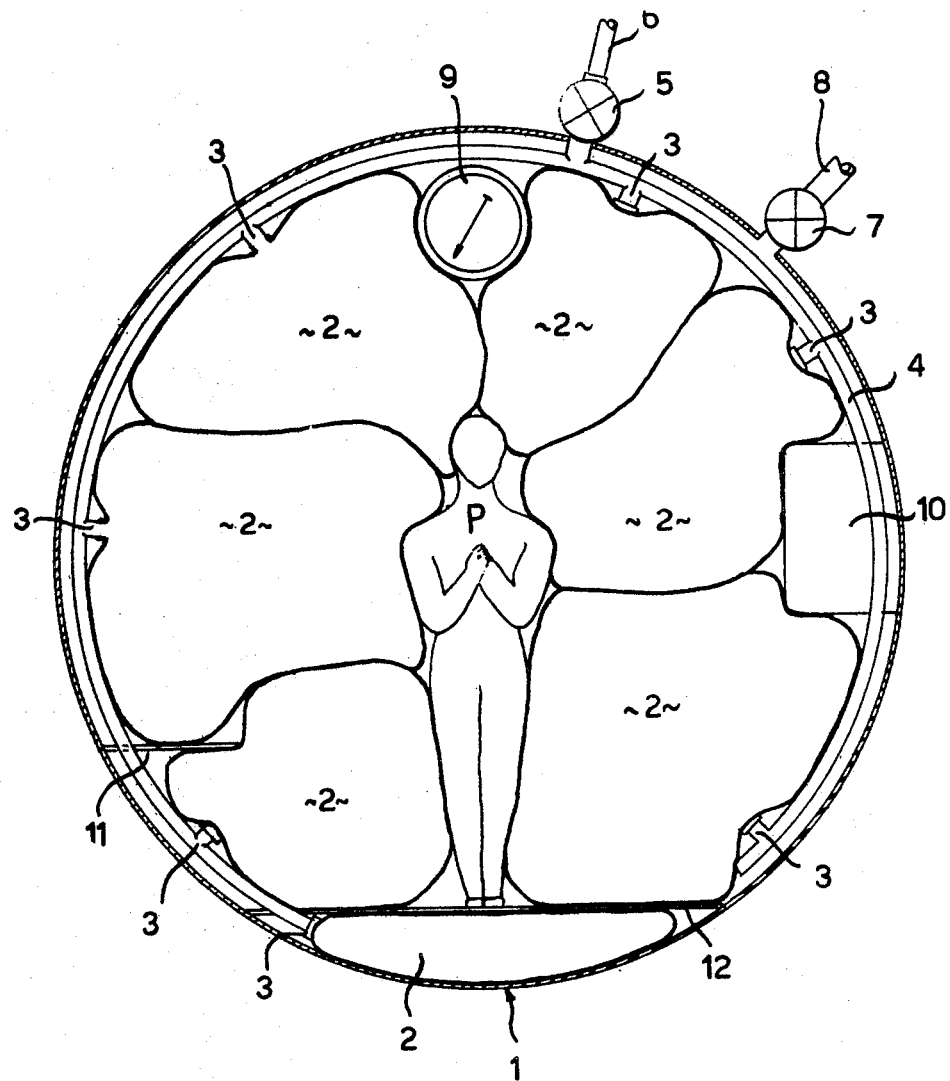
INVENTOR.
ROBERTO GALEAZZI,
BY
Berman, Davidson & Berman
ATTORNEYS.

METHOD AND MEANS FOR COMPLETELY SUBSTITUTING GASEOUS MIXTURES IN CLOSED ROOMS

This invention relates to rooms filled with gaseous mixtures and particularly with a breathable mixture, in which persons or animals must live in an atmosphere which is different from that of the usual atmospheric air, such as, for example, underwater living quarters, surface rooms for the hyperbaric oxygen-therapeutics and the like.

In these chambers or rooms it is necessary to substitute the atmospheric air (or another determined breathable mixture) with which the chamber is filled with a different breathable mixture.

When the mixture to be substituted comprises helium or rare gases, it is further necessary to recover the substituted mixture in order to re-utilize the rare inert gases.

The solution of the above problem presents considerable difficulties, particularly whenever inside the chamber there are men and delicate apparatus that cannot be completely immersed in water or another liquid. In fact, it is apparent that the most simple solution would be to replace the gaseous mixture which fills up the chamber with a liquid and successively replace the liquid with a new gaseous mixture but, for the aforesaid reasons, this process may be employed only in very rare cases.

Usually the substitution of the "original" breathing mixture or "air" is effected by feeding into the chamber large amounts of the "new" mixture, which mix with the air contained in the chamber which is gradually substituted with the new gases, until the new mixture reaches percentages close enough to the required ones. This involves a great initial waste of the new mixture and the impossibility of attaining the required degree of purity, except at the cost of enormous amounts of new mixture and peak-level expenses.

The object of the present invention is to provide a method permitting of replacing the atmospheric air, or any other "original" mixture inside a chamber, under superatmospheric pressure or not, with a "new" mixture, without mixing the one with the other and with the presence of living beings inside the chamber, permitting at the same time the immediate outside recovery of the substituted "original" mixture.

To this purpose, according to the invention, the "original" breathable mixture within the chamber, and which has to be substituted with the "new" one, is ejected by means of one or more membranes or bags of very flexible and thin gas-tight material, which are initially empty and reduced to the smallest dimensions, and which at a later time are inflated so to fill up the utmost possible portion of the chamber, after which the "new" breathable mixture is let into the chamber while emptying at the same time the bag or bags.

According to an embodiment of the invention, the closed membranes or the bag or bags, after their introduction into the chamber, are inflated with the new mixture. During this operation, the original mixture outside the bags is ejected outside of the chamber. After the bags inflated with the new mixture have filled up the utmost possible portion of the chamber, while ejecting the previous mixture from it, the same are open inside the chamber in order to let the new breathable mixture contained in them to flow out into the said chamber. The opening of the bags inside the chamber can be made by breaking, piercing or tearing the bags' wall, whereby in the latter case the bags have to be substituted at every change of the breathing mixture within the chamber. This however does not involve an exorbitant cost, since the bags can be made also of a quite economical material, and for example of a suitable plastic material. On the other hand, it is possible to supply the bags with suitable vent devices, such as, for example, valves and cocks, which may be opened under control and adapted to allow the new mixture contained within the bags to flow into the chamber.

According to another embodiment of the invention, the membranes or bags are inflated with air or any gas whatsoever and, after having filled up the utmost possible portion of the chamber, by ejecting the previous mixture from the same, the new mixture is allowed to flow directly into the chamber, at a pressure which is slightly higher than the one existing inside the bags, so that the bags come to be gradually deflated and their contents is pressed outside the chamber, which in its turn, comes to be filled up with the new mixture.

According to a preferred embodiment of the invention, a number of inflatable bags or membranes is arranged on the inside walls of the chamber, initially folded and possibly housed in suitable cases, and adapted to be connected, by means of suitable connections, to a tube for conveying the new mixture to be delivered into the chamber, or also to one or more feed and gas-discharge tubes for the simple inflation of the same bags, whereas the chamber in the first case, can be connected to an outlet of the old mixture and in the second case also to a delivery of the new mixture.

These and other features of the invention and the advantages deriving from it are made apparent from the following specification of one preferred embodiment, which is illustrated by way of example in the only figure of the accompanying drawing, wherein 1 is a chamber schematically shown in cross section, in which one or more persons should live for a certain time in a breathable mixture which is different from the normal atmospheric air. Chamber 1, that can be under superatmospheric pressure and located underwater or at the surface, is provided with an apparatus according to the invention, for substituting the atmospheric air or the breathable mixture, without mixing together the two breathable mixtures, while one or more persons are present in the chamber 1. To this purpose, inside said chamber 1, substantially gas-tight bags 2 made of very light, thin and flexible membranous material are arranged. Usually the material of the bags 2 is also a preferably not inflammable plastic material. Each bag 2 is connected, by means of a suitable connecting pipe 3 to a collecting main 4, which is, in turn, connected through a valve of cock 5, to a piping 6 connected to a source or reservoir (not shown) of new breathing mixture to be delivered. The collecting main 4 and the branchings 3 to the single bags 2 may be of a small size and are preferably fastened inside the walls of chamber 1. The bags 2, empty and accurately folded, are introduced into the chamber 1 and connected to the ends of the respective pipe 3, preferably only when it is needed to provide substitution of the atmospheric air or of the breathable mixture already existing within the same chamber 1. To this purpose, the single bags 2 can be supplied with suitable nipples for connections with the respective connecting pipes 3. Furthermore, the empty and folded bags 2 are also arranged on the inside walls of chamber 1, possibly in suitable cases (not shown), so that they occupy a most reduced space. Therefore, the whole device for substituting the breathable mixture within the chamber 2, when same is not used, is of a practically negligible encumbrance and does not influence in any way the normal movements of the person or persons dwelling within the chamber 1.

The interior of the chamber 1 is connected, through a valve or cock 7, to a discharge tube 8 of the mixture existing within the chamber 1, outside the walls of the bags 2. This discharge tube 6 can be simply vented to the atmosphere, outside of chamber 1, when the original breathable mixture within the chamber 1 and designed for being substituted with the new mixture, consists of normal atmospheric air. When on the contrary the breathable mixture to be substituted is a special mixture containing rare or costly inert gases, as for instance helium, the discharge pipe 8 can be connected to any apparatus whatsoever (not shown) for recovering said mixture. In order to substitute the breathable mixture existing inside the chamber 1 with another breathable mixture, one has to proceed in the following manner:

The bags 2, initially empty and folded in the chamber 1 are inflated with the new mixture fed through pipe 6 and valve 5 and distributed to the single bags 2 by means of the main 4 and of the connecting branchings 3. The feed valve 5 can be opened by an outside operator or by a person being inside the chamber 1 by conventional means. Simultaneously or precedingly, also the outlet valve 7 is opened. The new mixture is delivered into the bags 2 with a pressure which is only slightly higher than the one existing within the chamber 1. Consequently the bags 1 come to be gradually inflated and compel the preceding mixture, already existing within the chamber 1, to flow out through the outlet valve 7 and the adjoining pipe 8. The bags 2 are sized and arranged inside room 1 in such a way that, when they are completely or nearly completely inflated with the new mixture, they occupy the utmost possible portion of the same room 1 and wrapping up all the projections existing inside the chamber, as for example pressure gauges 9, cabinets 10, seats 11, dunnage 12, and others, and adhering also against the person or persons present in the chamber, all around the same, as shown in the drawing. With a suitable shaping and distribution of the bags 2 and with the utilization of bags having different sizes and also special shapes, to better fill up the various parts of chamber 1, the dead spaces, those that are not filled up by the inflated bags and in which therefore the preceding mixture remains, can be reduced to a minimum.

Successively, and after having closed the discharge valve 7, the bags 2 inflated with the new mixture, are opened inside the chamber 1, so as to cause the new mixture to flow into the latter. To open the inflated bags 2, the same may be simply torn, cut or pierced, or else each one might be provided with a suitable vent valve, which opens inside of the chamber 1 and is opened and closed under control, in a conventional manner. In the first case, the torn, cut or pierced bags are thrown away and have to be substituted with new ones, in order to effect the subsequent substitution of the mixture in the chamber 1, whereas in the second case, the deflated bags, provided of the vent valves, are completely emptied and folded, whereafter their valves are shut and the folded bags are stored in their cases for the subsequent operation. In both cases, the communication of the inside of the inflated bags 2 with the inside of the chamber can be effected by the persons that are inside of the chamber 1 or by outside operators, by means of suitable conventional control means.

During the above described substitution of the mixture in the chamber 1, the person or persons in this chamber can possibly employ for breathing a conventional breathing apparatus, which is preferably connected with suitable intakes provided at the interior of the chamber and is fed preferably with the new breathable mixture, that is, with the same mixture with which the bags 2 are inflated. The use of breathing apparatus by the person or persons that are inside the chamber 1, at the time of the substitution of the mixture, constitutes however a simple security means and it is not indispensable, in that the substitution of the mixture can be performed in such a short time that the use of suitable breathing apparatus is rendered even superflous. It is to be noted that some inflated bags can be left entire, respectively closed, that is filled with the new mixture, thus serving as filling material of these dead spaces which normally are not accessible or are not utilized during the use of the chamber 1.

The purity of the new breathable mixture with which the room 1 is filled by the above-described process by means of the inflatable bags 2, depends upon the quantity of the preceding mixture left within the dead spaces of the chamber 1, that is not ejected by the inflation of the bags. If after the first substitution of the breathable mixture the remainders of the preceding mixture are present in the new mixture in an admissible percentage, the operation of atmosphere substitution in the chamber 1 is completed. If on the contrary a greater purity of the new mixture is required, the operation might be repeated with the same method and upon completion of this second operation a breathable mixture containing only negligible percentages of the preceding mixture is obtained within the chamber 1.

The mixture which has been substituted and ejected from the chamber 1 through valve 7 and discharge pipe 8 can be completely recovered and re-utilized, possibly after a purifying operation.

A variation of the above-described process may consist in inflating the bags 2 from the exterior through conduit 6, valve 5, main 4 and ducts 3, with any gas whatsoever, and even with atmospheric air. Also in this case, the inflated bag 2 fills up the largest possible volume of the chamber 1, by ejecting the preceding breathable mixture through the opened valve 7 and the pipe 8, and wrapping also the body P of the person or persons, respectively of the animal or animals, which happen to be within chamber 1. Subsequently, the new breathable mixture is directly fed into the chamber 1, for example through the same valve 7, which thus serves both for the discharge of the preceding mixture and for the feeding of the new one. The new mixture may be also fed through another suitable feed connection, provided with its own valve. The new mixture delivered into the chamber 1 promotes the deflation of the bag 2 and their emptying at the outside through their main 4 and valve 5 with the annexed piping 6.

This variation of the process according to the invention is preferably applied to the chambers for hyperbaric oxygen therapy, in particular of the single-place types for the substitution of the atmospheric air with pure oxygen and vice versa. The feeding of the new mixture or of pure oxygen is performed preferably at atmospheric pressure, that is before setting the chamber under pressure. In this way, the residual air which is still within the dead spaces of the chamber, that is within the spaces not filled up by the inflated bags 2, mixes with the new breathable mixture or with the pure oxygen at atmospheric pressure, so that, when the mixture is set under pressure with the new mixture or with pure oxygen, the impurity percentage is further reduced. Of course, the same method may be also adopted with the other process variations according to the invention.

Another variation of the invention consists in placing the person or persons, respectively the animal or animals which happen to be within the chamber 1 or which may be introduced into the same, individually or by two or more together, in a bag of the kind of those indicated by 2, or in a membrane welded to the opening of a man hole of the chamber and by causing that bag to be adherent as much as possible to the body of the person or animal P, so as to eliminate the dead spaces, or else by previously enclosing therein a certain amount of the new mixture. Subsequently the new breathable mixture is fed into this bag or membrane, in order to inflate said bag inside of the chamber 1 until same completely fills up the chamber 1 and adhers to the walls of the same. In this case, the bag will be connected, both to the delivery pipe, and to the outlet, so as to permit the necessary internal ventilation, and might also be fitted with other suitable connections needed for the application of specific treatments, for the accomplishment of electrodiagnostic surveys, and others.

Of course, the invention is not restricted to the embodiments just described and illustrated but can be widely varied and modified, however without departing from the general principles heretofore described and claimed hereinafter.

I claim:

1. A method for completely substituting for a first breathable gaseous mixture in a closed chamber a second gaseous breathable mixture, comprising the steps of placing within said chamber at least one thin, flexible bag-like and inflatable membrane, inflating said membrane with said second gaseous mixture from outside the chamber to expand the membrane to substantially fill said chamber and expel said first gaseous mixture through a vent in the chamber, and subsequently feeding said second gaseous mixture from inside the membrane to its exterior to fill the chamber about said membrane with said second gaseous mixture and to deflate the membrane.

2. A method according to Claim 1, wherein said step of feeding the second gaseous mixture from inside the membrane to outside the membrane is performed by opening the membrane inside the chamber in order to release the second gaseous mixture to flow into the chamber while the membrane collapses.

3. A method according to Claim 2, wherein said step of feeding the second gaseous mixture from inside said membrane to outside the membrane is performed by puncturing the membrane.

4. A method according to Claim 1, wherein a breathing apparatus is supplied within said chamber so that a person inside said chamber may breathe during said steps of inflating and deflating the membrane.

5. A method according to Claim 1, wherein said membrane is placed about a living being in said chamber and caused to adhere to the body of the living being so as to eliminate dead spaces, said membrane then being inflated to completely fill the chamber and adhere to the inner walls thereof, while ejecting said first gaseous mixture, whereafter said step of feeding the second gaseous mixture to the exterior of the membrane is performed by destroying said membrane.